Sept. 25, 1956

J. MERCIER 2,763,990

FOLLOW-UP SYSTEM

Filed March 14, 1955

3 Sheets-Sheet 1

INVENTOR
Jean Mercier
BY
Dean Fairbank + Hirsch
ATTORNEYS

Sept. 25, 1956

J. MERCIER 2,763,990

FOLLOW-UP SYSTEM

Filed March 14, 1955

3 Sheets-Sheet 2

INVENTOR
Jean Mercier
BY
Dean Fairbank + Hirsch
ATTORNEYS

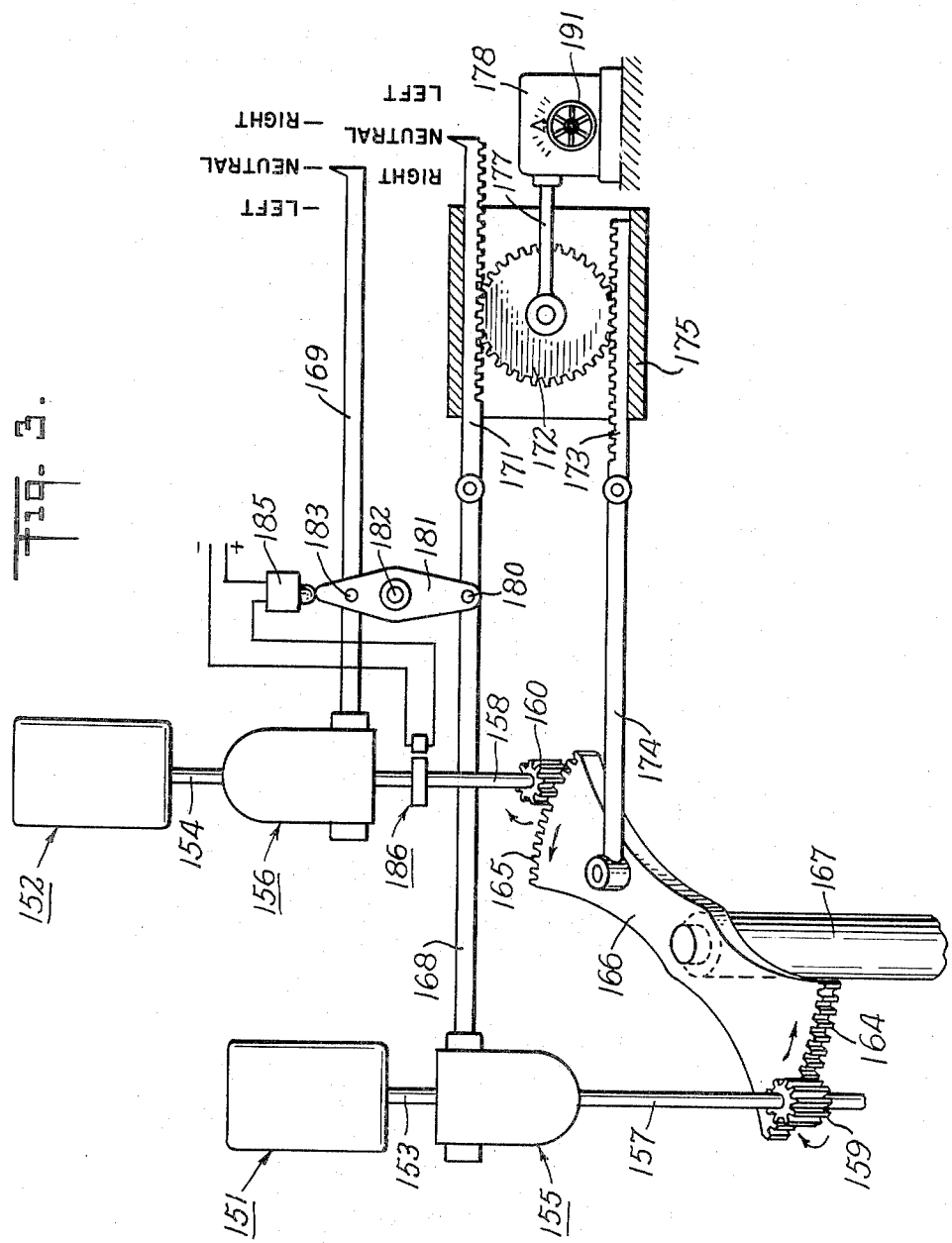

United States Patent Office 2,763,990
Patented Sept. 25, 1956

2,763,990
FOLLOW-UP SYSTEM
Jean Mercier, New York, N. Y.

Application March 14, 1955, Serial No. 494,209

13 Claims. (Cl. 60—97)

This invention relates to the art of follow-up systems and more particularly to the control for effecting displacement of a movable member.

As conducive to an understanding of the invention, it is noted, for example, that to keep a vessel on a given heading or direction, only relatively small and slow angular displacement of the rudder is required, on either side of a neutral position, with need for relatively little power. To change direction of the vessel rapidly and a considerable amount, a correspondingly rapid, extensive angular displacement of the rudder must be effected which requires relatively high power and such high power is also required when the movement of the rudder is impeded, such as by the force of the waves thereagainst or the resistance of the water against ready displacement of the rudder which increases with the speed of the vessel.

Where a system is provided with a single source of power to perform both of said functions, the power available would have to be high with the result that small displacements of the rudder which require but little power, would be uneconomical and difficult to control as the application of high power might cause movement beyond the desired position. Furthermore, in the event of failure of the single power source, the system would be inoperative.

It is accordingly among the objects of the invention to provide a follow-up system which is relatively simple in construction and is not likely to become deranged and which renders available both low and high power and will dependably and economically utilize such available power as required with resultant efficiency in operation.

According to the invention, sufficient power is available to effect normal operation of a movable member such as a rudder controlled by a steering unit. In the event the phase difference between the position of the rudder and the steering unit should exceed a predetermined amount, an additional power source will be combined with the first power source to operate the rudder and such additional power source will be cut off when the phase difference has been reduced to a predetermined amount.

Figure 1:
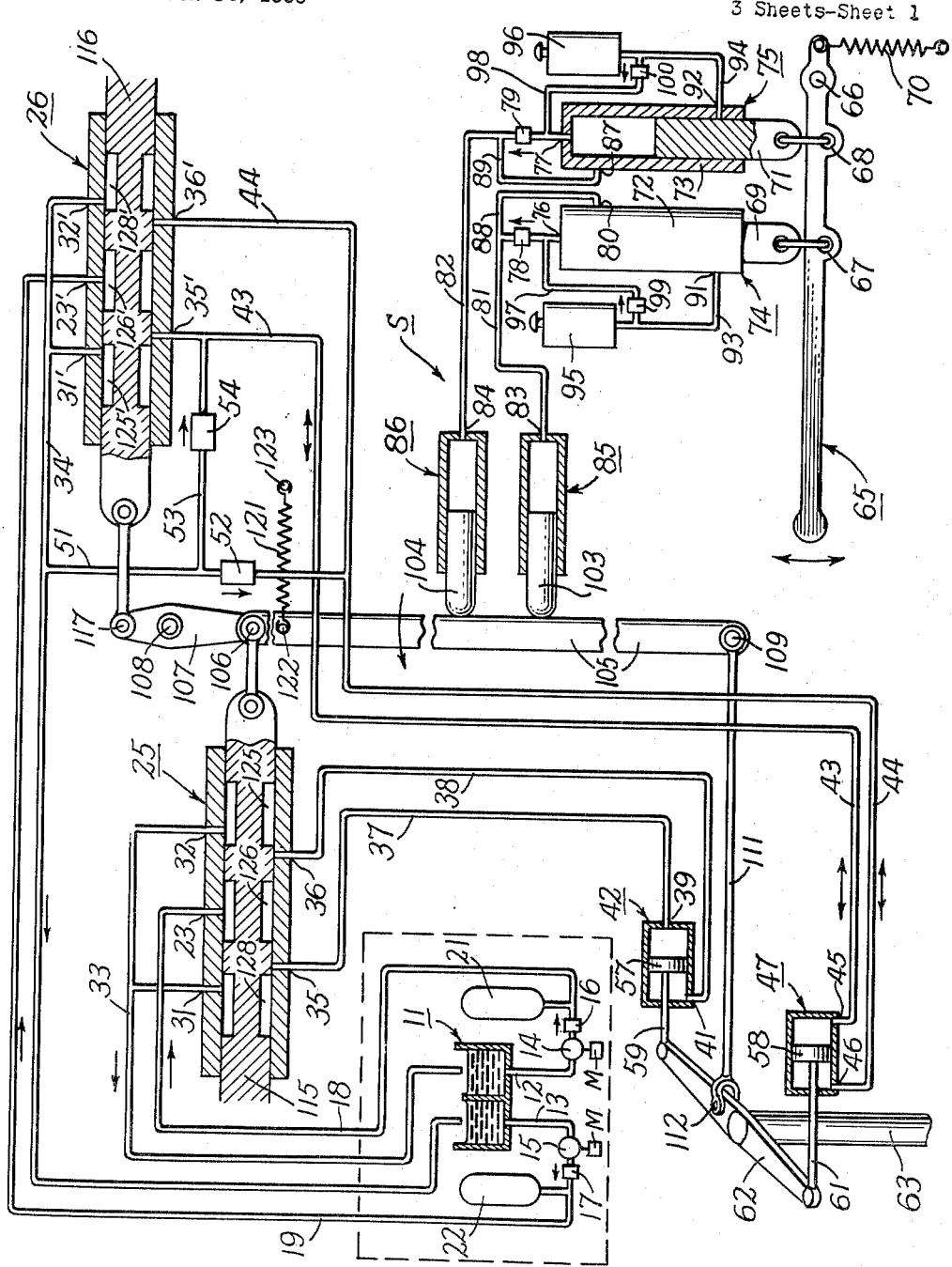
Figure 2:
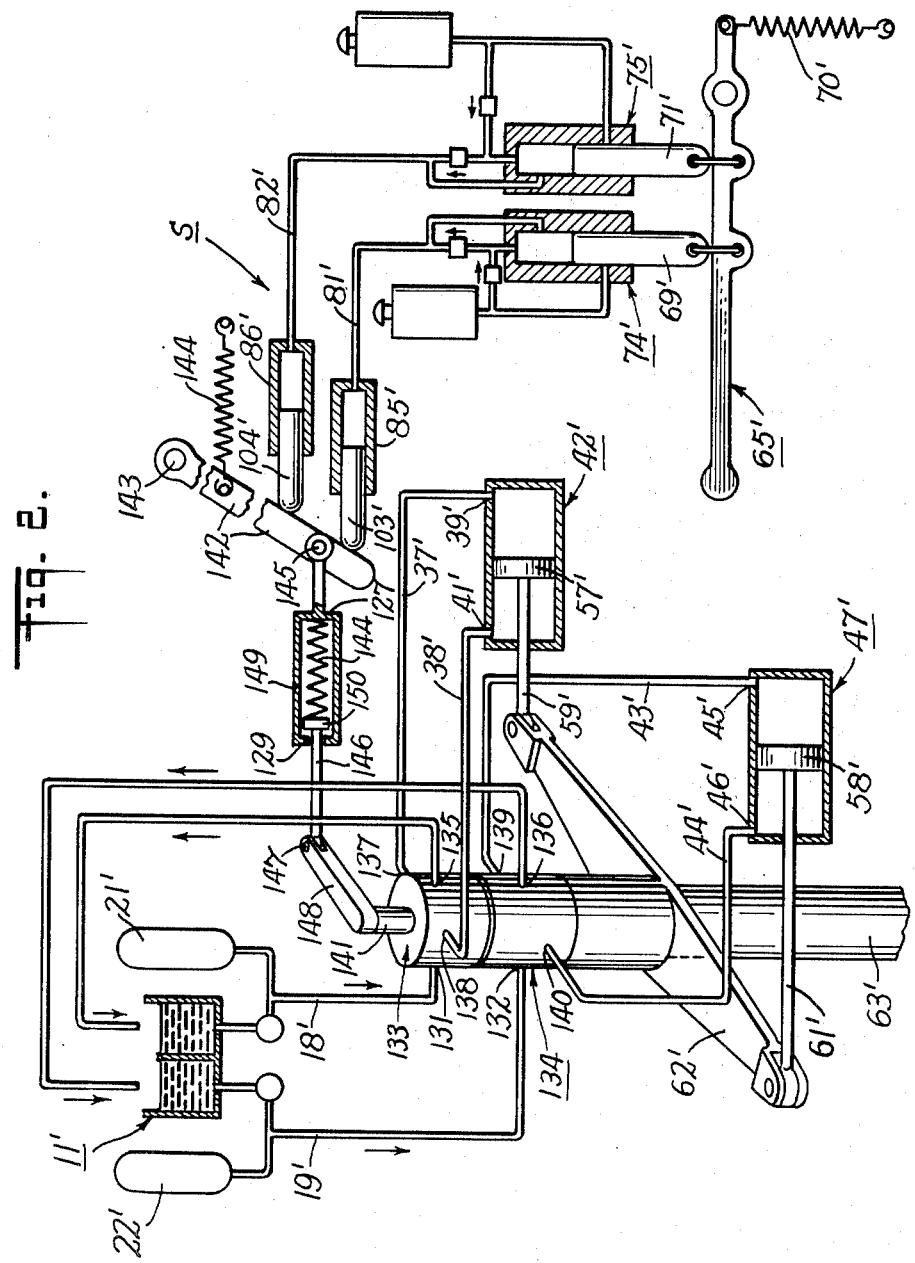

In the accompanying drawings in which are shown one or more of various possible embodiments of the several features of the invention, Fig. 1 is a diagrammatic view of one embodiment of the system, Fig. 2 is a view similar to Fig. 1 of another embodiment of the system, and Fig. 3 is a view similar to Fig. 1 of still another embodiment.

This application is a continuation-in-part of copending application Serial No. 410,956, filed February 17, 1954.

Referring now to the drawings, the system shown in Fig. 1 desirably comprises a reservoir 11 connected by lines 12 and 13 to pumps 14 and 15 respectively, each driven by an associated motor M. The outlets of said pumps are connected through associated one-way valves 16 and 17 to feed lines 18 and 19 respectively. Connected to each of the feed lines are pressure accumulators 21 and 22 of conventional type.

The feed lines 18 and 19 are connected respectively to inlet ports 23, 23' of selector valves 25 and 26. The selector valves 25 and 26 have discharge ports 31, 32 and 31', 32' respectively connected by return lines 33 and 34 to the reservoir 11 and two control ports 35, 36 and 35', 36'. The selector valves are identical and of the conventional four-way type having a neutral position in which all ports are closed, and two operating positions.

Ports 35 and 36 are connected by lines 37 and 38 to the ports 39 and 41 of hydraulic unit 42 and the ports 35' and 36' are connected by lines 43 and 44 to the ports 45 and 46 of hydraulic unit 47.

The line 34 is connected by line 51 through one-way valve 52 to line 44 and by lines 51 and 53 through one-way valve 54 to line 43, the valves 52 and 54 permitting flow only from line 34 to lines 44 and 43 respectively.

Each of the hydraulic units has a piston 57, 58 slidably mounted therein, the two ports of each hydraulic unit being positioned respectively on opposed sides of the associated piston. Affixed at one end to each of the pistons 57, 58 is a piston rod 59, 61 respectively, the outer end of each of which is connected by suitable linkage to the cross bar 62 which is rigidly connected to the shaft 63 of a rudder, for example (not shown).

In the illustrative embodiment, the positon of the rudder shaft 63 is controlled by a steering mechanism S which includes a control lever 65 which may be located at some remote position such as on the deck of a ship. The lever 65 which is pivotally mounted near one end as at 66 has pivotally connected thereto as at 67, 68 the ends of plungers 69, 71 slidably mounted in cylinders 72, 73, said plungers and cylinders defining fluid pressure transmitters 74, 75. The lever 65 is normally urged in a clockwise direction about its pivot 66 by a coil spring 70 affixed to the end of the lever adjacent pivot 66.

The closed end of each of the cylinders 72, 73 has a port 76, 77 connected through one-way valves 78, 79 and lines 81, 82 to the ports 83, 84 in hydraulic actuators 85, 86 respectively. The cylinders 72, 73 each has a port 80, 87 near its closed end connected by lines 88, 89 to the lines 81, 82 past the one-way valves 78, 79, and an additional port 91, 92 conencted by lines 93, 94 to a reservoir 95, 96. The reservoirs are connected by lines 97, 98 through one-way valves 99 and 100 to lines 81, 82 between the ports 76, 77 and the one-way valves 78, 79.

The hydraulic actuators 85, 86, each has a piston 103, 104 slidable thereon which react against a lever 105 pivotally connected at one end as at 106 to a bar 107 pivotally mounted off center as at 108. The other end of lever 105 is pivotally connected as at 109 to one end of a control rod 111 pivoted at its other end as at 112 to the cross bar 62 on one side of the rudder shaft 63.

The plunger 115 of selector valve 25 is connected by suitable linkage to the pivotal connection 106 on bar 107 and the plunger 116 of selector valve 26 is connected by suitable linkage to bar 107 as at 117, the distance between the pivotal mount 108 of bar 107 to pivotal connection 106 being greater than the distance between such pivotal mount 108 to pivotal connection 117.

A coil spring 121 is connected at one end as at 122 to lever 105 near pivotal connection 106 and to a fixed support 123 at its other end to urge said lever in a clockwise direction about pivot 109 and to retain the lever 105 against plungers 103, 104.

In the operation of the system shown in Fig. 1, the motors M are energized and consequently fluid will be forced from the reservoir 11 by pumps 14 and 15 into feed lines 18 and 19 respectively. As the selector valves 25, 26 are in neutral closed position, the accumulators 21 and 22 will charge. When the pressure in the accumulators has attained a desired value, through suitable conventional means (not shown) further flow of fluid into the accumulators will be cut off.

Assuming that the control lever 65 is moved slightly say in the order of one degree to move plungers 69, 71 inwardly, as the fluid pressure transmitters 74, 75, the hydraulic actuators 85, 86 and the connecting lines are filled with fluid, such inward movement of plungers 69, 71 will cause a corresponding outward movement of plungers 103, 104 of actuators 85, 86.

As the end of lever 105 pivoted at 109 will be restrained from movement by reason of the connection of rod 111 to cross bar 62 of rudder shaft 63 which requires considerable force for movement, the lever 105 will be pivoted in a counterclockwise direction about pivot 109 against the tension of coil spring 121.

Such movement of lever 105 will cause the bar 107 to rotate in a clockwise direction about its pivot 108 and the plungers 115, 116 of both selector valves will be moved inwardly. As the movement of plunger 115 will be greater than that of plunger 116, the ports 32, 36 of valve 115 will first be connected through annular groove 125 in plunger 115 to provide a passageway from the reservoir 11 to the port 41 of hydraulic unit 42. Thereupon, with further movement of plungers 115 and 116, the ports 31' and 35' of valve 26 will be connected through annular groove 125' in plunger 116 to provide a passageway from port 45 of hydraulic unit 47 to reservoir 11 and the ports 23 and 35 of valve 25 will be connected through annular groove 126 in plunger 115 to provide a passageway from accumulator 21 to port 39 of hydraulic unit 42.

As a result, fluid under pressure will flow from accumulator 21 into port 39 of hydraulic unit 42 to move the piston 57 therein to the left causing the cross bar 62 to turn in a counterclockwise direction from the position shown. Such movement of the cross bar 62 will cause the piston 58 of hydraulic unit 47 to move to the right forcing fluid from port 45 through line 43 and ports 35', 31' back to the reservoir.

Such movement of piston 58 would create a vacuum in hydraulic unit 47 which would cause air to enter the unit with resultant malfunctioning thereof except for the valve 52. Thus, when such vacuum is created, valve 52 will open so that fluid will flow from line 34 into port 46 of hydraulic unit 47.

As a result of such movement of the cross bar 62 due to the one degree movement of control lever 65, the course of the ship will be correspondingly altered. The movement of cross bar 62 will cause the control rod 111 to be moved to the left from the position shown in Fig. 1 pulling on the end 109 of lever 105. As the tensed coil spring 121 will retain the lever 105 against plungers 103, 104, such plungers will act as a pivot for the lever 105 so that it will move in a clockwise direction to pivot bar 107 in a counterclockwise direction about its pivot 108 to restore the selector valves to their neutral position.

At this time the rudder shaft 63 will be in the one degree turn position. If the control lever 65 is then released, as the spring 121 is under a slightly greater tension than it is in its original position, it will cause the lever 105 to pivot in a clockwise direction about its pivot 109, forcing the plungers 103, 104 inwardly.

Such movement of the plungers 103 and 104 and lever 105 by spring 121 is afforded by reason of the fact that the force exerted against plungers 103, 104 by lever 105 due to the action of spring 121 when it is in normal condition is equal to the force exerted against plungers 69, 71 by lever 65 due to the action of spring 70 when the lever is in neutral position. Hence, as the control lever 65 has been released, the plungers 103, 104 will force fluid from actuators 85, 86 through lines 81, 82 into units 74, 75 and the plungers 69, 71 will move until lever 65 is in neutral position.

As a result of the movement of lever 105 in a clockwise direction about pivot 109, the bar 107 will rotate in a counterclockwise direction causing the plungers 115, 116 of valves 25, 26 to move outwardly from the neutral position shown, the same distance as the inward movement thereof.

Consequently, the ports 31, 35 of valve 25 will first be connected through annular groove 128 in plunger 115 and then the ports 32', 36' of valve 26 will be connected through annular groove 128' and the ports 23, 36 of valve 25 will be connected through annular groove 126.

As a result of the connection of ports 23 and 36, fluid will flow from accumulator 21 through line 18, ports 23, 36, line 38 into port 41 of hydraulic unit 42 to move the piston 57 therein to the right. This will cause the cross bar 62 and rudder shaft to rotate in a clockwise direction back toward its original position. Movement of cross bar 62 will cause control rod 111 to move to the right so that lever 105 will pivot about plungers 103, 104 in a counterclockwise direction moving the plungers 115, 116 of valves 25, 26 back to neutral position.

As a result, the system will be restored to its original position ready for the next steering action.

In the event the initial movement of control lever 65 was through a considerable arc, say an angle of four or five degrees, the initial pivotal movement of lever 105 would be sufficient to cause not only the ports 23 and 35 of valve 25 to be connected, but also to cause the ports 23', 36' of valve 26 to be connected.

As a result, fluid under pressure would be applied to port 39 of hydraulic unit 42 and port 46 of hydraulic unit 47 from both pressure accumulators 21 and 22. Thus, the combined force exerted by both of the hydraulic units 42, 47 will move the rudder shaft 63 to the desired position.

In the event there should be too much fluid in the steering control system defined by units 74, 75, lines 81, 82 and actuators 85, 86, by merely moving the lever 65 downwardly from the position shown in Fig. 1, until ports 91 and 92 were exposed by the plungers 69, 71, such excess fluid would be expelled by the pressure exerted by plungers 103, 104 into the associated reservoirs 95, 96.

If there should be insufficient fluid in the steering control system, the plungers 69, 71 are moved past ports 86, 87 and then back again to create a suction in the lines 97, 98 which will draw fluid into the system from the associated reservoir.

In the embodiment of Fig. 2 which is similar in many respects to the embodiment of Fig. 1, corresponding parts have the same reference numerals primed.

In this embodiment, the feed lines 18', 19' from pressure accumulators 21', 22' are connected to the inlet ports 131, 132 of selector valves 133, 134. The valves have discharge ports 135, 136 and control ports 137, 138 and 139, 140 respectively.

The selector valves, one of which is rigidly affixed on top of the other, are of the conventional four-way type having a neutral position in which all ports are closed and two operating positions. The rotatable members (not shown) of each of the valves are controlled by a common shaft 141 and such valves are conformed that upon movement of shaft 141 in a counterclockwise direction, for example, first ports 135, 138 of valve 133 will be connected, then ports 136, 139 of valve 134 and ports 131, 137 of valve 133 will be connected and with further rotation of shaft 141, ports 132, 140 of valve 134 will be connected. Similarly, upon rotation of shaft 141 in a clockwise direction, first ports 135, 137 of valve 133 will be connected, then ports 136, 140 of valve 134 and ports 131, 138 of valve 133 will be connected and with further rotation of shaft 141, ports 132, 139 of valve 134 will be connected.

The rigidly connected valves 133, 134 are affixed to the end of rudder shaft 63' so that upon rotation of such shaft 63' in the manner to be described, the valves 133, 134 will rotate in the corresponding direction.

Ports 137, 138 of valve 133 are connected by lines 37', 38' to the ports 39' and 41' of hydraulic unit 42' and the ports 139, 140 of valve 134 are connected by lines 43', 44' to the ports 45', 46' of hydraulic unit 47'.

Each of the hydraulic units has a piston 57', 58' slidably mounted therein, the two ports of each hydraulic unit being positioned on opposed sides of the associated piston. Affixed at one end to each of the pistons 57', 58' is a piston rod 59', 61' respectively, the outer end of each of which is connected by suitable linkage to the cross bar 62' which is rigidly connected to the rudder shaft 63'.

As the steering mechanism S' and hydraulic actuators 85', 86' controlled thereby is identical to the corresponding structure shown in Fig. 1, it will not be described in detail.

The plungers 103', 104' of actuators 85', 86' react against a lever 142 pivoted at one end as at 143 and retained against such plungers as by a coil spring 144 affixed at one end to lever 142 adjacent its pivotal mount 143.

Pivotally connected to lever 142 adjacent its free end as at 145 is one end of a control rod 146 the other end of which is pivotally connected as at 147 to the end of an arm 148 affixed at its other end to the shaft 141.

The control rod 146 desirably comprises a cylinder 149 in which a piston 150 is slidably mounted, retained against end 129 of the cylinder by a strong coil spring 130. The portion of the control rod 146 pivoted at one end to arm 148 extends through end 129 of the cylinder and is affixed to the piston. The other portion of the control rod 146 is affixed at one end to the other end 127 of cylinder 149.

In the operation of the system shown in Fig. 2, the accumulators 21', 22' are charged in the manner described with respect to the embodiment of Fig. 1.

Upon movement of the plungers 103', 104' by slight movement, say one degree of lever 65' of the steering mechanism S', the lever 142 will be moved in a clockwise direction about its pivot 143 against the tension of spring 144 to rotate arm 148 and shaft 141 in a counterclockwise direction. By reason of the cylinder 149 and split rod 146, in the event of jamming of arm 148, no injury will be caused to the parts connected thereto.

Movement of shaft 141 in a counterclockwise direction will, as previously described, first connect ports 135, 138 to provide a path from port 41' of hydraulic unit 42' to reservoir 11', then ports 136, 139 of valve 134 will be connected to provide a path from port 45' of hydraulic unit 47' to reservoir 11 and ports 131, 137 of valve 133 will be connected to provide a path from accumulator 21' to port 39' of hydraulic unit 42'.

As a result of the above fluid paths, the piston 57' of hydraulic unit 42' will be moved to the left causing the cross bar 62' and shaft 63' to turn in a counterclockwise direction to alter the course of the ship. The rotation of shaft 63' will cause the casings of valves 133, 134 affixed thereto to rotate in a corresponding direction and as the shaft 141 of the valves is restrained by the linkage including arm 148, rod 147, lever 142 and spring 144, the valves will again be restored to neutral position in which all the ports are closed.

At this time the rudder shaft will be in the one degree turn position. If the control lever 65' is then released, as the spring 144 is under tension due to the original movement of lever 142, it will cause the lever 142 to pivot in a counterclockwise direction about its pivot 143. Such movement of the lever 142 and plungers 103', 104' by spring 144 is afforded by reason of the fact that the force exerted against plungers 103', 104' by lever 142 due to the action of spring 144 when it is in normal position is equal to the force exerted against plungers 69', 71' by lever 65' due to the action of spring 70' when lever 65' is in neutral position.

Hence, as the control lever 65' has been released, the plungers 103', 104' will force fluid from actuators 85', 86' through lines 81', 82' into units 74', 75' and the plungers 69', 71' will move until lever 65' is in neutral position.

As a result of the movement of lever 142 in a counterclockwise direction about pivot 143, the arm 148 will be rotated in a clockwise direction. Hence, as previously described, first ports 135, 137 of valve 133 will be connected to provide a path from port 39' of hydraulic unit 42' to reservoir 11', then ports 136, 140 of valve 134 will be connected to provide a path from port 46' of hydraulic unit 47' to reservoir 11 and ports 131, 138 of valve 133 will be connected to provide a path from accumulator 21' to port 41' of hydraulic unit 42'.

As a result of the above fluid paths, the piston 57' of hydraulic unit 42' will be moved to the right causing the cross bar 62' and shaft 63' to turn in a clockwise direction to restore the rudder of the ship to its original position.

The rotation of shaft 63' will cause the casings of valves 133, 134 affixed thereto to rotate in a clockwise direction and as the shaft 141 of the valves is restrained by the linkage to lever 142, the valves will again be restored to neutral position and the system is ready for the next steering action.

In the event the initial movement of control lever 65' was through a considerable arc, say an angle of four or five degrees, the initial pivotal movement of lever 142 would be sufficient to cause not only the ports 136, 139 of valve 134 to be connected but also to cause the ports 132, 140 to be connected.

As a result fluid under pressure would be applied to port 39' of hydraulic unit 42' and port 46' of hydraulic unit 47' from both pressure accumulators 21' and 22'. Thus, the combined force exerted by both of the hydraulic units will move the rudder shaft to the desired position.

In the embodiment shown in Fig. 3, two drive units 151, 152 are provided which may be electric motors, gasoline engines, diesel engines or the like. The shafts 153, 154 of said drive units are connected to conventional fluid drive units 155, 156, having drive shafts 157, 158 respectively.

Each of the shafts 157, 158 mounts a pinion 159, 160 which mesh respectively with an arcuate gear conformation 164, 165 at the ends of a cross bar 166 affixed on a rudder shaft 167, for example.

The fluid drive units 155, 156, which have a neutral position and two operating positions are controlled by bars 168, 169 respectively, the former having a rack conformation 171 at one end engaged by a gear 172. The gear 172 is also engaged by the rack conformation 173 at one end of a control rod 174, the other end of which is pivotally connected to cross bar 166 between the shaft 167 and gear conformation 165.

As is clearly shown in Fig. 3 the bar 168 and control rod 174 are guided by rails 175 and respectively engage diametrically opposed sides of the gear 172, the latter being rotatably mounted at the end of a reciprocable shaft 177 actuated by suitable control mechanism such as a Sperry automatic pilot 178.

Pivotally connected to the bar 168 as at 180 is one end of an arm 181 pivotally mounted as at 182, the arm also being pivotally connected to bar 169 as at 183. As shown, the distance between pivot 182 and pivotal connection 180 is greater than the distance between pivot 182 and pivotal connection 183.

The arm 181 actuates a switch 185 which controls a solenoid operated brake 186 associated with shaft 158. The brake is locked when the fluid drive units are in neutral position so that shaft 158 will be restrained from movement, thereby preventing movement of the rudder shaft 167.

In the operation of the system shown in Fig. 3, the automatic pilot is manually operated by rotation of a wheel 191 for example, say in the order of one degree to move the shaft 177 outwardly. As the rod 174 is restrained from movement by reason of its connection to cross bar 166 affixed to the rudder shaft 167 which requires considerable force to rotate, the gear 172 will rotate along rack 173 moving bar 168 to the left. As a result, arm 181 will rotate in a clockwise direction about its pivot 182 actuating switch 185 to release the solenoid controlled brake 186 so that shaft 158 is free to rotate.

As the distance between pivot 182 to pivotal connection 183 is less than the distance between pivot 182 and pivotal connection 189, although the slight movement of bar 168 is sufficient to shift the drive unit 155 from neutral position to one of its operating positions, it is not sufficient to shift drive unit 156 from neutral position.

When drive unit 155 has been so shifted, shaft 157 thereof will be turned by continually operating drive unit 151 in a clockwise direction, for example, to rotate the cross bar 166 and rudder shaft 167 in a counterclockwise direction to alter the course of the ship correspondingly.

As the fluid drive unit 156 is in neutral position, shaft 158 thereof will rotate freely upon movement of cross bar 166.

As a result of such counterclockwise movement of cross bar 166, the rod 174 will be moved to the left. Such movement of the rod 174 will cause the rack 173 thereof to rotate gear 172 in a clockwise direction restoring the bar 168 to its original position thereby shifting fluid drive unit 155 to neutral position and causing arm 181 to actuate switch 185 to cause brake 186 to again lock shaft 158 to prevent movement of the rudder shaft 167.

At this time the rudder shaft will be in the one degree turn position. If the steering wheel 191 is then restored to normal or neutral position, to move the shaft 177 to the right, the gear 172 will be rotated in a clockwise direction along the rack 173 to move the bar 168 to the right. As a result, the arm 181 will be pivoted to actuate switch 185 to release brake 186 and the fluid drive unit will be shifted from neutral position to the other operating position in which shaft 157 will be rotated in a counterclockwise direction.

As a result, cross bar 166 and rudder shaft 167 will be restored to their original neutral position and such movement of cross bar 166 will, through control rod 174, rotate gear 172 in a counterclockwise direction to restore bar 168 to neutral position. Consequently, switch 185 will again be actuated to lock brake 186 and the fluid drive unit 155 will be shifted to neutral position ready for the next steering action.

In the event the initial movement of shaft 177 corresponded to a greater movement of the rudder than one degree, the movement of bar 168 would be sufficient to cause both of the fluid drive units to be shifted from neutral position to operating position so that the combined force exerted by both the drive units 151, 152 will move the rudder shaft to the desired position.

By reason of the dual arrangement of the steering control systems S and S' of the embodiments of Figs. 1 and 2 and the two separate power sources of the embodiments of Figs. 1, 2 and 3, if one of the steering systems or one of the power sources should fail the other would be available thereby assuring reliable steering action.

In the systems above described, it is to be noted that as soon as initial movement is imparted to the rudder shaft, the system will automatically attempt to restore itself to neutral position. Thus, if the rudder responds readily to the movement of the steering control and only a small angular displacement of the rudder is required, only one power source will be used. However, if the rudder does not respond quickly or if a large angular displacement is required, when the phase difference between the position of the rudder and the steering control exceeds a predetermined amount, both of the power sources will be connected to move the rudder with resultant dependable steering action.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A system of the character described comprising a driven member movable in opposite directions, a pair of power sources each independently capable of actuating said driven member, means including a control unit having a neutral position and two operating positions operatively connecting each of said power sources to said driven member to effect movement of the latter in each of its directions of movement, control means normally in neutral position to shift first one of said control units from neutral to one operating position to effect movement of the driven member in one direction and after movement of said control means a predetermined amount from its neutral position to shift the other of said control units from neutral to one operating position to effect movement of the movable member in the same direction, and means controlled by movement of said driven member to restore said control units to neutral position in reverse order.

2. A system of the character described comprising a driven member movable in opposite directions, a pair of hydraulically actuated units operatively connected to said driven member, a first and second source of fluid under pressure each independently capable of actuating said driven member, a pair of valves each having a neutral position and two operating positions, means connecting each of said pressure sources through an associated valve to said hydraulic units respectively, control means normally in neutral position to shift first one of said valves from neutral to operating position to effect movement of said driven member in one direction and after movement of said control means a predetermined amount from its neutral position to shift the other of said valves from neutral to one operating position to effect movement of said movable member in the same direction, and means controlled by movement of said driven member to restore said valves to neutral position in reverse order.

3. The combination set forth in claim 2 in which said valves each include a movable member, a lever is operatively connected to said movable members and the control means includes a fluid pressure controlled member reacting against said lever.

4. The combination set forth in claim 3 in which a pair of fluid pressure controlled members is provided reacting against said lever, each of said members comprising a plunger and the control means also includes a pair of fluid pressure transmitters connected respectively to said fluid pressure controlled members to actuate the plungers thereof, whereby when said control means is restored to neutral position said control units will be successively shifted from neutral position to the other operating positions to effect movement of the movable member in the opposite direction for restoration of said control units to neutral position by the means controlled by movement of said driven member.

5. The combination set forth in claim 4 in which each of the fluid pressure transmitters comprise a casing closed at one end and having a port near said end, a line connecting said port to an associated fluid pressure controlled member, a plunger slidable in each casing, a reservoir having a port associated with said casing, said casing having a port remote from the closed end thereof, lines connecting the reservoir port to the ports in said casing, a one-way valve in the line between the port in the end of the casing and the fluid pressure controlled member permitting flow only toward said member, and a one-way valve in the line between the port of the reservoir and said port in the end of said casing permitting flow only into said casing port.

6. The combination set forth in claim 2 in which said valves each include a movable member, a lever movable from neutral position is operatively connected to said movable members, the control means includes a fluid pressure controlled member having a plunger reacting against said lever, and a fluid pressure transmitter connected to said fluid pressure controlled member to actuate the plunger thereof.

7. The combination set forth in claim 6 in which said fluid pressure transmitter comprises a casing closed at one end and having a port near said end, a line connecting said port to said fluid pressure controlled member, a plunger slidable in said casing, said casing having a port remote from the closed end thereof, a reservoir having a port, lines connecting the reservoir port to the ports in said casing, a one-way valve in the line between the port in the end of the casing and the fluid pressure controlled member permitting flow only toward said member, a one-way valve in the line between the port of said reservoir and said port in the end of said casing permitting flow only into said casing port, a control lever movable from neutral position to actuate said casing plunger and resilient means associated respectively with the lever operatively connected to said movable member and with said control lever respectively, the forces exerted by both of said levers against the associated plunger by the tension of said resilient means being substantially equal when said levers are in neutral position.

8. A hydraulic system of the character described comprising a first and second source of fluid under pressure, a pair of hydraulically controlled members each having a movable element, means associated with each of said sources to control the flow of fluid therefrom to an associated hydraulically controlled member, means to actuate said control means, said actuating means and said control means connecting first one of said sources to the associated hydraulically controlled member and after actuation of said control means a predetermined amount connecting the other of said sources to the associated hydraulically controlled member, and means operatively connected to the means to actuate the control means and controlled by the movement of the movable elements of said hydraulically controlled member, successively to deactuate said control means in reverse order to their actuation.

9. The combination set forth in claim 8 in which each of said control means comprises a valve having a pair of control ports, an inlet port and a discharge port, said valve means each having a movable member to connect the inlet port with one of said control ports and the discharge port with the other control port, the hydraulically controlled members each has a pair of ports on each side of the movable member, and the valves are conformed to connect their discharge ports to the control ports connected to one of the ports of each of the associated hydraulically controlled members before connection of their inlet ports to the control ports connected to the other of the ports of each of the hydraulically controlled member.

10. The combination set forth in claim 8 in which each of said control means is a valve having a neutral position and two operating positions, a plunger controls each of said valves, a lever is pivotally connected at one end to one of said plungers, a member pivotally mounted between its ends is pivotally connected on each side of its pivotal mount to both said plungers, the distance between the pivotal mount of said member to the pivotal connection of the plunger connected to said lever being greater than the distance between the pivotal mount of said member to the pivotal connection thereto of the other plunger, a shaft, a cross bar affixed to said shaft, linkage connecting each of said movable elements of the hydraulically controlled members to said cross bar on each side of said shaft respectively, the means controlled by the movement of said movable elements comprises linkage between the cross bar and the other end of said lever and pivotally connected thereto, means to pivot said lever and resilient means urging said lever against said means.

11. The combination set forth in claim 10 in which each of said hydraulically controlled members has a port on each side of its movable element, each of said valves has two control ports, a line connects each of said control ports to the ports of the assocated hydraulically controlled members, each of the valves has a discharge port, a line is connected to each of said discharge ports, a line connects each of the control ports of one of said valves to the associated discharge port line, and a one-way valve is provided in each of the lines from the control port to the discharge line, said valve permitting flow only in direction from the discharge line into the control port lines when the pressure in the discharge line exceeds the pressure in the control line by a predetermined amount.

12. A hydraulic system of the character described comprising a first and second source of fluid under pressure, a rotatable shaft, a cross bar rigid with said shaft, a pair of hydraulically controlled members each having a movable element operatively connected to said cross bar on each side of said shaft, a pair of superimposed valves affixed to said shaft, each having a rotatable member, said valves having a common control shaft controlling said rotatable members, said valves each having a neutral position and two operating positions, said valves being displaced so that upon rotation of said common shaft, first one of the valves will be shifted from neutral to one operating position and then the second valve will be so shifted, said valves controlling flow of fluid from an associated source to an associated hydraulically controlled member, means to actuate said common valve shaft to connect first one of said sources to an associated hydraulically controlled member and after actuation of said common shaft a predetermined amount, to connect the other source to the hydraulically controlled member, whereby said cross bar shaft will be rotated by at least one of said hydraulically controlled members, and means to restrain movement of said common shaft when said cross bar shaft is rotating to restore said valves to neutral position in reverse order to their actuation.

13. The combination set forth in claim 12 in which the means to actuate said common valve shaft comprises an arm affixed at one end to said shaft, a lever pivotally mounted near one end, a linkage between the arm and the free end of said lever, means to pivot said lever and resilient means normally retaining said lever against said means to pivot the latter.

14. A system of the character described comprising a driven member movable in opposite directions, a pair of power sources each independently capable of actuating said driven member, a pair of fluid drive units operatively connected to an associated power source, said fluid drive units each having a neutral position and two operating positions, means operatively connecting the fluid drive units to the driven member to effect movement of the latter in each of its directions of movement, control means normally in neutral position to shift first one of said fluid drive units from neutral to one operating position to effect movement of the driven member in one direction and after movement of said control means a predetermined amount from its neutral position to shift the other of said control units from neutral to one operating position to effect movement of the driven member in the same direction and means controlled by movement of said driven member to restore said fluid drive units to neutral position in reverse order.

15. The combination set forth in claim 14 in which means are provided to restrain movement of said driven member by the second fluid drive unit, until the first fluid drive unit is shifted from neutral position.

16. The combination set forth in claim 14 in which the control means comprises a control unit having a reciprocable shaft, a gear rotatably mounted at one end of said shaft, the means controlled by movement of said driven member comprises a rod having a rack conformation at its free end engaging said gear, a pair of slidably mounted bars operatively connected to said fluid drive units respectively to shift the latter, the bar connected to the first fluid drive unit to be shifted having a rack at one end also engaging said gear, a member pivotally mounted between its ends between said bars and pivotally connected to the latter, the distance between the pivotal mount of said member to the pivotal connection to the bar engaging said gear being greater than the distance between the pivotal mount of said member to the pivotal connection of the other bar.

17. The combination set forth in claim 16 in which said driven member is a shaft having a cross bar rigidly affixed thereto, the ends of said cross bar having arcuate gear conformations, and each of the fluid drive units has a shaft with a pinion thereon engaging an associated gear conformation.

18. The combination set forth in claim 17 in which a brake is associated with one of said fluid drive unit shafts and movement of said pivotally mounted member upon actuation of said control unit releases said brake.

No references cited.